(12) United States Patent
Ono (10) Patent No.: US 6,856,335 B2
(45) Date of Patent: Feb. 15, 2005

(54) OPTICAL SCANNING DEVICE FOR SCANNING PLURAL SURFACES AND IMAGE FORMING APPARATUS USING THE OPTICAL SCANNING DEVICE

(75) Inventor: Nobuaki Ono, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 192 days.

(21) Appl. No.: 10/059,371

(22) Filed: Jan. 31, 2002

(65) Prior Publication Data

US 2002/0101494 A1 Aug. 1, 2002

(30) Foreign Application Priority Data

Jan. 31, 2001 (JP) ........................................ 2001-024739

(51) Int. Cl.[7] .......................... B41J 2/385; G03G 13/04
(52) U.S. Cl. ..................... 347/115; 347/134; 347/243; 347/260
(58) Field of Search ................................. 347/117, 115, 347/118, 133, 134, 243, 246, 258, 259, 260

(56) References Cited

U.S. PATENT DOCUMENTS

| | | | | |
|---|---|---|---|---|
| 4,419,676 A | * | 12/1983 | Markus Lenk et al. | 347/243 |
| 4,578,688 A | * | 3/1986 | Okuno | 347/118 |
| 4,761,046 A | * | 8/1988 | Funato | 347/118 |
| 4,823,002 A | * | 4/1989 | Saito | 347/259 |
| 4,893,179 A | * | 1/1990 | Ito | 347/115 |

(List continued on next page.)

FOREIGN PATENT DOCUMENTS

JP 4-127115 4/1992

OTHER PUBLICATIONS

U.S. Appl. No. 10/820,733, filed Apr. 9, 2004, Suhara et al.
U.S. Appl. No. 10/804,068, filed Mar. 19, 2004, Nishina et al.
U.S. Appl. No. 10/127,768, filed Apr. 23, 2002.
U.S. Appl. No. 09/715,151, filed Nov. 20, 2000, pending.
U.S. Appl. No. 09/765,608, filed Jan. 22, 2001, pending.
U.S. Appl. No. 09/769,510, filed Jan. 26, 2001, pending.
U.S. Appl. No. 09/797,563, filed Mar. 5, 2001, allowed.
U.S. Appl. No. 09/810,184, filed Mar. 19, 2001, pending.
U.S. Appl. No. 09/833,821, filed Apr. 13, 2001, pending.
U.S. Appl No. 09/860,520, filed May 21, 2001, pending.
U.S. Appl. No. 09/873,256, filed Jun. 5, 2001, pending.
U.S. Appl. No. 09/910,797, filed Jul. 24, 2001, pending.
U.S. Appl. No. 09/946,665, filed Sep. 6, 2001, pending.
U.S. Appl. No. 09/968,546, filed Oct. 2, 2001, pending.
U.S. Appl. No. 09/982,831, filed Oct. 22, 2001, pending.

(List continued on next page.)

*Primary Examiner*—Susan Lee
(74) *Attorney, Agent, or Firm*—Oblon, Spivak, McClelland, Maier & Neustadt, P.C.

(57) ABSTRACT

An optical scanning device for scanning plural surfaces including a plurality of laser light units each configured to emit a laser beam, a deflecting device configured to deflect the laser beams from the plurality laser light units to sweep a plurality of predetermined planes, respectively, and a scanning image forming optical unit configured to project the laser beams deflected by the deflecting device on the plural surfaces, respectively, to scan the plural surfaces with the laser beams. The scanning image forming optical unit includes a plurality of optical detecting devices configured to detect the laser beams and a first plurality of reflecting devices positioned to reflect at least two laser beams of the laser beams toward one of the plurality of optical detecting devices.

9 Claims, 6 Drawing Sheets

U.S. PATENT DOCUMENTS

| | | | |
|---|---|---|---|
| 5,278,587 A * | 1/1994 | Strauch et al. | 347/118 |
| 5,834,766 A * | 11/1998 | Suhara | 347/243 |
| 5,841,465 A * | 11/1998 | Fukunaga et al. | 347/258 |
| 5,844,707 A * | 12/1998 | Minakuchi et al. | 347/246 |
| 5,999,345 A | 12/1999 | Nakajima et al. | |
| 6,052,211 A * | 4/2000 | Nakajima | 347/243 |
| 6,069,724 A | 5/2000 | Hayashi et al. | |
| 6,081,386 A | 6/2000 | Hayashi et al. | |
| 6,104,522 A | 8/2000 | Hayashi et al. | |
| 6,130,768 A | 10/2000 | Ono | |
| 6,166,842 A | 12/2000 | Aoki et al. | |
| 6,172,788 B1 * | 1/2001 | Suzuki et al. | 347/243 |
| 6,185,026 B1 | 2/2001 | Hayashi et al. | |
| 6,188,086 B1 | 2/2001 | Masuda et al. | |
| 6,233,081 B1 | 5/2001 | Suzuki et al. | |
| 6,256,133 B1 | 7/2001 | Suzuki et al. | |
| 6,288,819 B1 | 9/2001 | Aoki et al. | |
| 6,317,246 B1 | 11/2001 | Hayashi et al. | |
| 6,347,004 B1 | 2/2002 | Suzuki et al. | |
| 6,348,988 B2 | 2/2002 | Aoki et al. | |
| 6,348,989 B2 | 2/2002 | Aoki et al. | |
| 6,359,717 B2 | 3/2002 | Suzuki et al. | |
| 6,366,384 B1 | 4/2002 | Aoki et al. | |
| 6,376,837 B1 | 4/2002 | Itabashi et al. | |
| 6,381,057 B1 | 4/2002 | Itabashi | |
| 6,384,949 B1 | 5/2002 | Suzuki | |
| 6,388,792 B1 | 5/2002 | Atsuumi et al. | |
| 6,400,391 B1 | 6/2002 | Suhara et al. | |
| 6,417,509 B1 | 7/2002 | Atsuumi et al. | |
| 6,429,956 B2 | 8/2002 | Itabashi | |
| 6,448,998 B1 | 9/2002 | Suzuki et al. | |
| 6,462,853 B2 | 10/2002 | Hayashi | |
| 6,469,772 B1 | 10/2002 | Itabashi | |
| 6,473,105 B1 * | 10/2002 | Tanaka et al. | 347/118 |
| 6,498,617 B1 | 12/2002 | Ishida et al. | |
| 2002/0051054 A1 * | 5/2002 | Shiraishi et al. | |

OTHER PUBLICATIONS

U.S. Appl. No. 09/985,753, filed Nov. 6, 2001, pending.
U.S. Appl. No. 10/084,485, filed Feb. 28, 2002, pending.
U.S. Appl. No. 10/085,707, filed Mar. 1, 2002, pending.
U.S. Appl. No. 10/101,937, filed Mar. 21, 2002, pending.
U.S. Appl. No. 10/247,702, filed Sep. 20, 2002, pending.
U.S. Appl. No. 10/095,913, filed Mar. 13, 2002, Ema et al.
U.S. Appl. No. 10/214,559, filed Aug. 9, 2002, Ishida et al.
U.S. Appl. No. 10/323,837, filed Dec. 20, 2002, Suzuki et al.
U.S. Appl. No. 09/552,657, filed Apr. 19, 2000, Nakajima.
U.S. Appl. No. 09/888,600, filed Jun. 26, 2001, Andoh et al.
U.S. Appl. No. 09/984,236, filed Oct. 29, 2001, Masuda et al.
U.S. Appl. No. 10/102,633, filed Mar. 22, 2002, Ameyama et al.
U.S. Appl. No. 10/161,659, filed Jun. 5, 2002, Suzuki et al.
U.S. Appl. No. 10/161,756, filed Jun. 5, 2002, Atsuumi et al.
U.S. Appl. No. 10/183,748, filed Jun. 28, 2002, Nihei et al.
U.S. Appl. No. 10/200,778, filed Jul. 24, 2002, Amada et al.
U.S. Appl. No. 10/223,294, filed Aug. 20, 2002, Satoh et al.
U.S. Appl. No. 10/319,624, filed Dec. 16, 2002, Ono et al.
U.S. Appl. No. 10/058,446, filed Jan. 28, 2002.

* cited by examiner

OPTICAL SCANNING DEVICE FOR SCANNING PLURAL SURFACES AND IMAGE FORMING APPARATUS USING THE OPTICAL SCANNING DEVICE

BACKGROUND OF THE INVENTION

1. Field of the Invention

The present invention relates to an optical scanning device for scanning a plurality of media and an image forming apparatus using the optical scanning device.

2. Discussion of the Background

A color electrophotographic image forming apparatus includes in a housing a plurality of optical devices which respectively emit as scanning beams a plurality of laser beams output by a plurality of light sources. The scanning beams emitted from the housing scan their corresponding photoconductors, serving as a plurality of media, to form thereupon latent images of an image in their corresponding colors, respectively, each corresponding to a different color. The latent images are developed, i.e., made into visible images, with developers of corresponding colors, respectively, and the developed images are sequentially transferred onto a transfer sheet (recording sheet), superimposing one upon another, thereby forming a color image on the transfer sheet.

More specifically, a color electrophotographic image forming apparatus such as a digital copier and a laser printer includes four photoconductor drums arranged in a direction in which a transfer sheet is conveyed. Charged surfaces of the photoconductor drums are exposed by scanning beams corresponding to yellow, magenta, cyan, and black, respectively, so that latent images corresponding to yellow, magenta, cyan, and black are formed thereupon. Then, the latent images are developed into visible images by developing devices using developers of corresponding colors. The visible images are sequentially transferred onto a transfer sheet, superimposing one upon another, thereby forming a color image on the transfer sheet.

In the above-described color image forming apparatus, for scanning the four photoconductor drums with laser beams, respectively, a plurality of scanning devices, one for each photoconductor drum, are used. Accordingly, a large space is necessary, and thus the size of the image forming apparatus is increased.

Japanese Patent Laid-open publication No. 4-127115 discloses an optical scanning device for color image forming apparatuses in which a plurality of optical beams are incident on a single deflector and respective scanning image forming optical systems including mirrors are arranged in a vertically layered manner so that the whole parts of the optical scanning device are accommodated in one housing.

Figure 5:
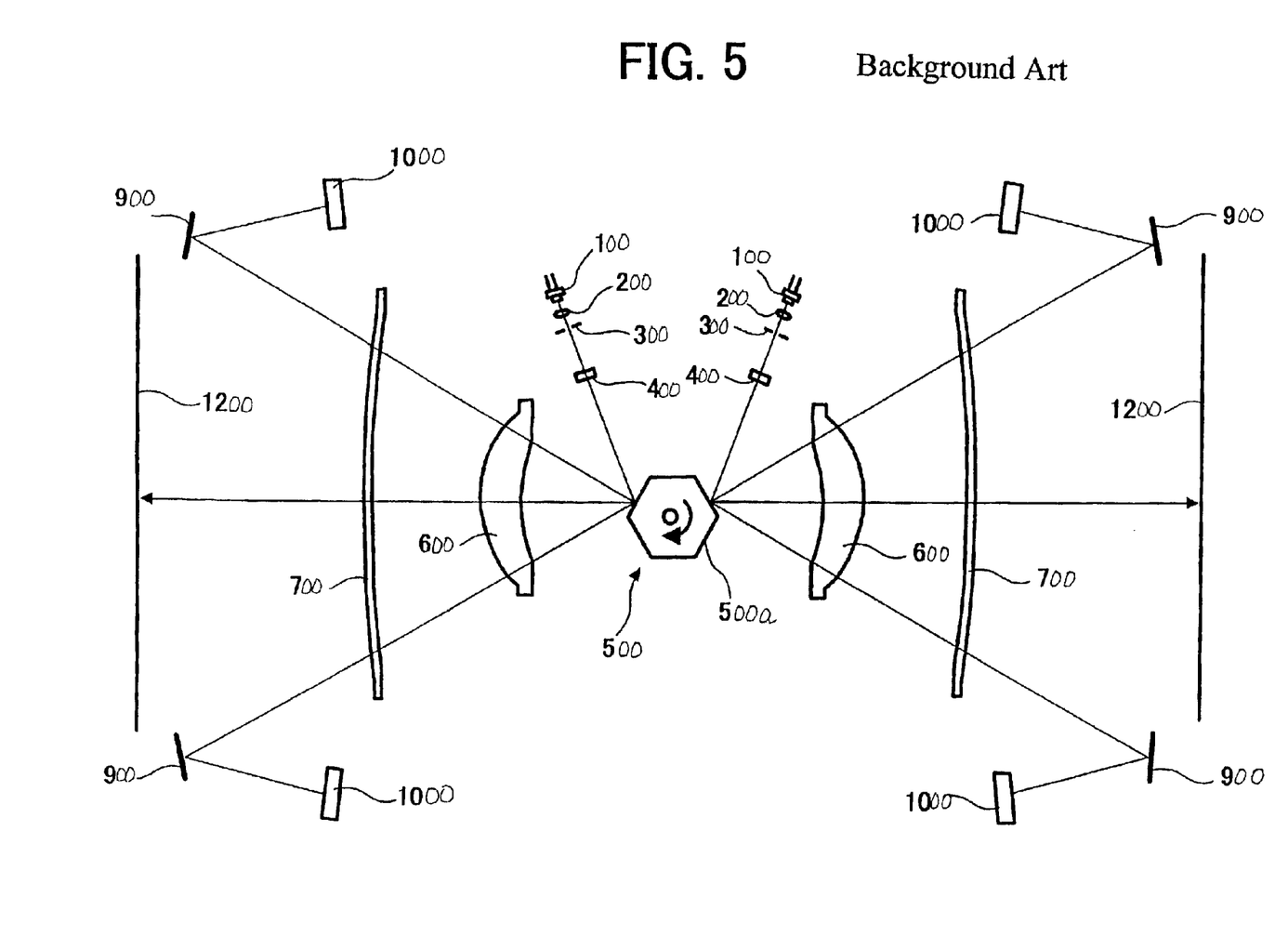
FIG. 5 is a plane view for explaining a construction of a background optical scanning device.
Figure 6:
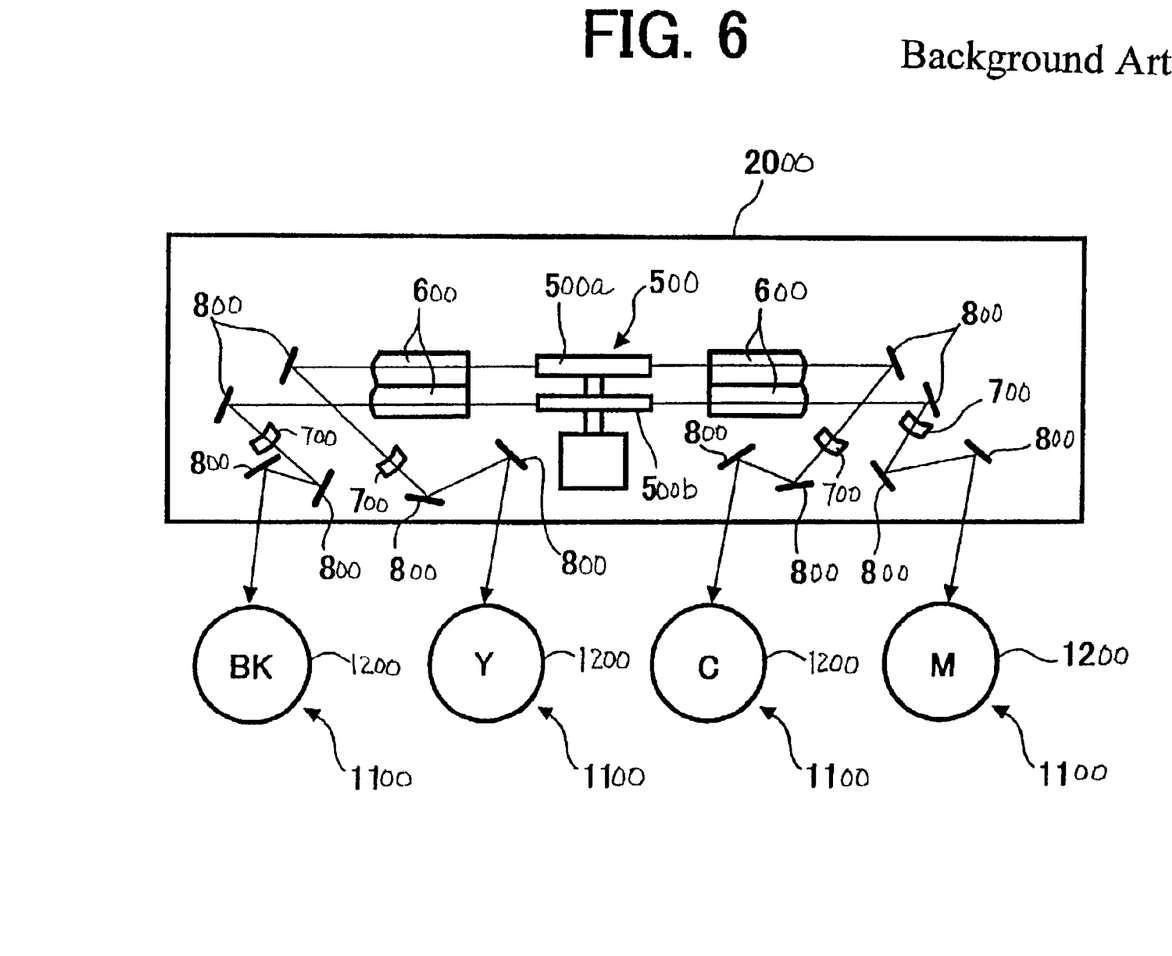
FIG. 6 is a side view illustrating a relation between the optical scanning device and photoconductor drums of an image forming apparatus.

FIGS. 5 and 6 illustrate an optical scanning device described above. FIG. 5 is a plane view for explaining arrangement of a reflecting device and an optical detecting device in the optical scanning device, and FIG. 6 is a side view illustrating a relation between the optical scanning device and each photoconductor drum.

In the optical scanning device illustrated in FIG. 5, laser beams are emitted from laser light sources 100, and shaped by a coupling lens 200, respectively. After passing an aperture 300, a cylindrical lens 400, serving as a first image forming optical system, forms a respective one of the laser beams into a line image long in the main scanning direction in the vicinity of a deflecting reflective surface of a polygon mirror (500a) of a rotating deflector 500. Then, each of the laser beams is deflected by the polygon mirror (500a) so as to sweep a predetermined plane. Further, first and second scanning lenses 600, 700, serving as a second image forming optical system, and three mirrors 800 (illustrated in FIG. 6) project the laser beam on a surface 1200 of a photoconductor drum 1100, thereby scanning the surface 1200.

In the optical scanning device illustrated in FIG. 5, two laser beams emitted from different laser light sources 100 are incident on different deflecting reflective surfaces of the single polygon mirrors (500a) of the rotating deflector 500 at the same time. Thus, the two laser beams are deflected simultaneously by the single polygon mirror (500a).

Referring to FIG. 6, the rotating deflector 500 includes the polygon mirror (500a) and another polygon mirror (500b) arranged in upper and lower steps, respectively, and two optical systems projecting the laser beams from the two laser light sources 100 on the surfaces 1200, respectively, are provided for the polygon mirror (500a) at the upper step and two other similar optical systems are provided for the polygon mirror (500b) at the lower step. Thus, four optical systems in total are arranged in one housing.

Thus, the above-described scanning device scans the surfaces 1200 of the four photoconductor drums 1100 at the same time with four laser beams emitted from four laser light sources 100 for forming images of magenta (M), cyan (C), yellow (Y), and black (BK), respectively. In FIG. 6, colors of images formed on the four photoconductor drums 1100 are indicated by M, C, Y, and BK, respectively.

In the optical scanning device described above, to detect each timing of scanning the surfaces 1200 with the laser beams, generally, synchronizing sensors 1000 are provided as illustrated in FIG. 5. Further, synchronizing mirrors 900 are arranged in the vicinity of both ends of optical paths of the laser beams scanning the surfaces 1200, respectively, so that the laser beams deflected by the deflector 500 are reflected toward the synchronizing sensors 1000, respectively.

However, providing a synchronizing mirror 900 and a synchronizing sensor 1000 for each of the four laser beams increases the cost of the scanning device. Further, the size of the housing for the scanning device is increased, leading to increase in the size of an image forming apparatus using such a scanning device.

SUMMARY OF THE INVENTION

According to one aspect of the present invention, an optical scanning device for scanning plural surfaces includes a plurality of laser light units each configured to emit a laser beam, a deflecting device configured to deflect the laser beams from the plurality of laser light units to sweep a plurality of predetermined planes, respectively, and a scanning image forming optical unit configured to project the laser beams deflected by the deflecting device on the plural surfaces, respectively, to scan the plural surfaces with the laser beams. The scanning image forming optical unit includes a plurality of optical detecting devices configured to detect the laser beams and a first plurality of reflecting devices positioned to reflect at least two laser beams of the laser beams toward one of the plurality of optical detecting devices.

According to another aspect of the present invention, an image forming apparatus includes a plurality of photoconductors, and an optical scanning device configured to scan the plurality of photoconductors to form a latent image in a color thereupon. The optical scanning device includes a plurality of laser light units each configured to emit a laser beam, a deflecting device configured to deflect the laser beams from the plurality laser light units to sweep a plurality of predetermined planes, respectively, and a scanning image forming optical unit configured to project the laser beams deflected by the deflecting device on the plurality of photoconductors, respectively, to scan the plurality of photoconductors with the laser beams. The scanning image forming optical unit includes a plurality of optical detecting devices configured to detect the laser beams and a first plurality of reflecting devices positioned to reflect at least two laser beams of the laser beams toward one of the plurality of optical detecting devices.

BRIEF DESCRIPTION OF THE DRAWINGS

A more complete appreciation of the present invention and many of the attendant advantages thereof will be readily obtained as the same becomes better understood by reference to the following detailed description when considered in conjunction with accompanying drawings, wherein.

DETAILED DESCRIPTION OF THE PREFERRED EMBODIMENTS

Referring now to the drawings, wherein like reference numerals designate identical or corresponding parts throughout the several views, preferred embodiments of the present invention are described.

Figure 1:
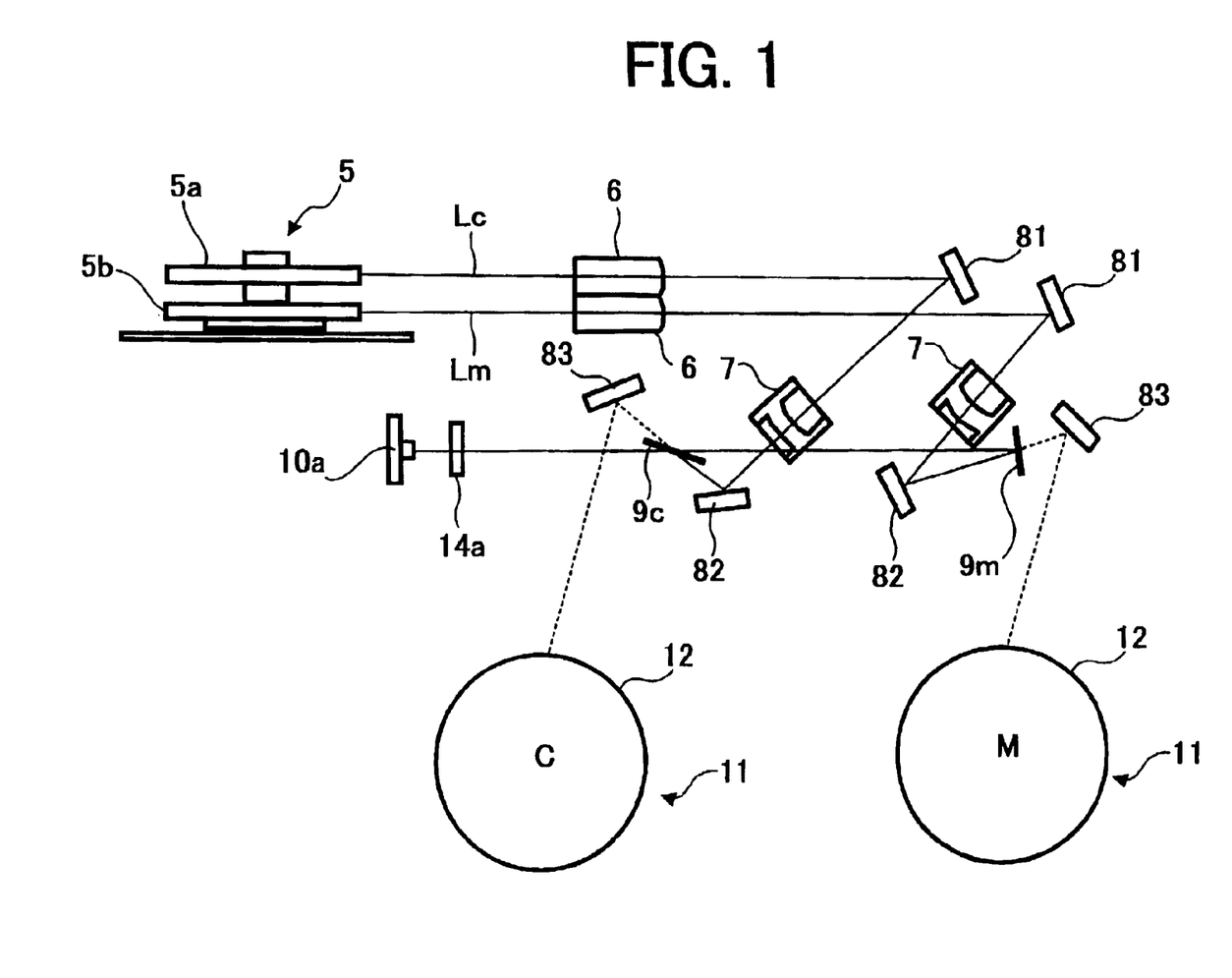
FIG. 1 is a side view of an optical scanning device according to an embodiment of the present invention.
Figure 2:
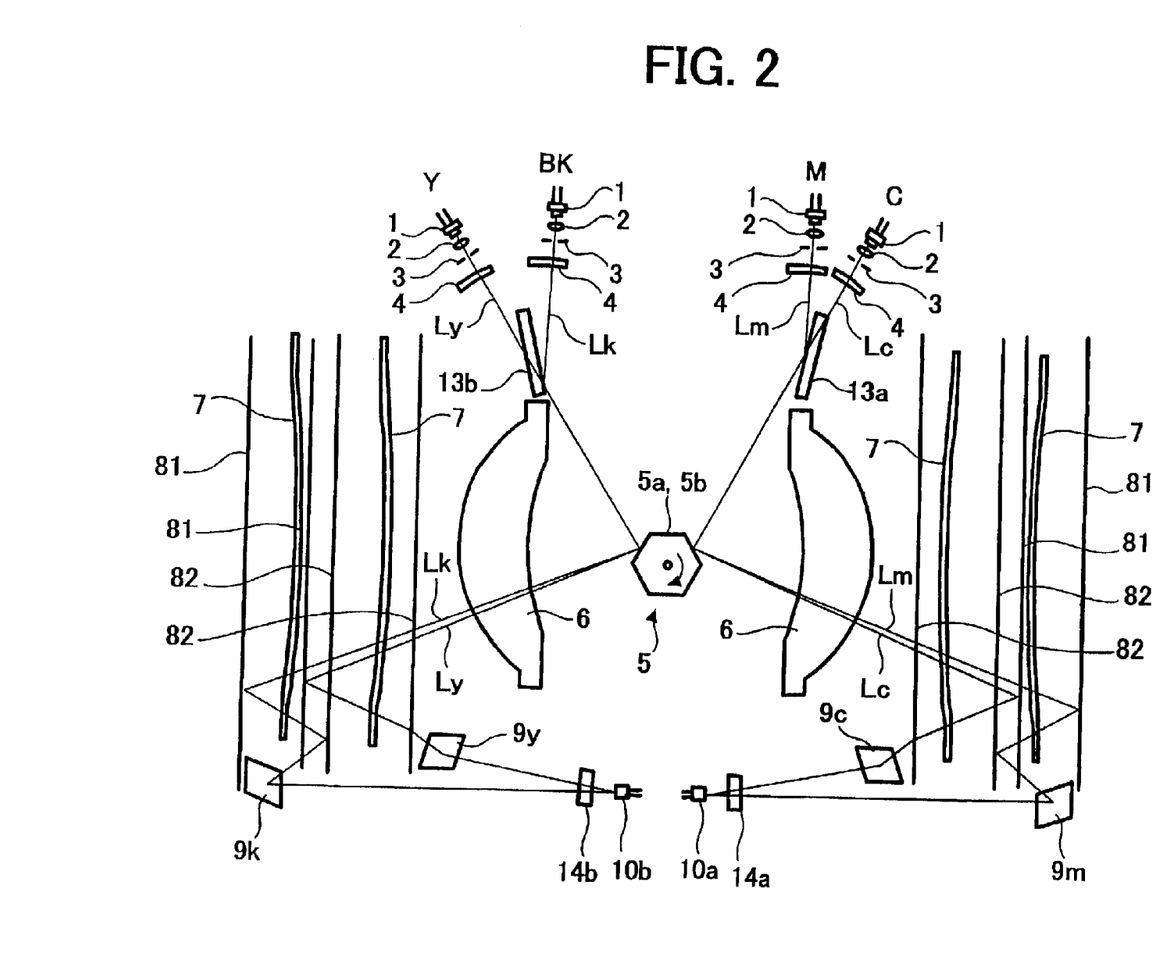
FIG. 2 is a plane view of the optical scanning device schematically illustrating the overall construction of the optical scanning device.

FIG. 1 is a side view of an optical scanning device according to one embodiment of the present invention, illustrating an arrangement of optical elements and photoconductor drums with respect to one side of a rotating deflector. FIG. 2 is a plane view of the optical scanning device, schematically illustrating the overall construction of the optical scanning device.

The optical scanning device n FIG. 2 includes four light source units each having a laser light source 1, a coupling lens 2, and an aperture 3, and four cylindrical lenses 4 each serving as a first image forming optical system for a laser beam emitted from each light source unit. The light source units emit laser beams, Lm, Lc, Ly and Lk, for magenta (M), cyan (C), yellow (Y) and black (BK) colors, respectively.

At the laser light sources, laser beams from the laser light sources 1 are shaped by the coupling lenses 2, and pass the apertures 3 to be emitted as the laser beams (Lm, Lc, Ly, Lk) for respective colors. Each of the laser beams (Lm, Lc, Ly, Lk) is formed by the cylindrical lens 4 as the first image forming optical system into a line image long in the main scanning direction in the vicinity of a deflecting reflective surface of a rotating deflector 5 serving as a deflecting device.

The rotating deflector 5 includes polygon mirrors (5a, 5b) arranged in upper and lower steps, as illustrated in FIG. 1. The laser beams, Lc and Ly, for cyan and yellow colors are incident on the polygon mirror (5a) at the upper step, and the laser beams, Lm and Lk, for magenta and black colors are incident on the polygon mirror (5b) at the lower step.

The laser light source 1 for magenta and the laser light source 1 for cyan, and the laser light source 1 for yellow and the laser light source 1 for black are respectively arranged deviated from each other in the horizontal direction as illustrated in FIG. 1 for facilitating assembling of the optical scanning device. Thereby, the laser beams, Lm and Lc, and the laser beams, Ly and Lk, emerge in directions different from each other, respectively.

Accordingly, two mirrors (13a, 13b) are provided so that the laser beam, Lm, is reflected by the mirror (13a) so as to be incident on the rotating deflector 5 in the same incident direction as for the laser beam, Lc, and so that the laser beam, Lk, is reflected by the mirror (13b) so as to be incident on the rotating deflector 5 in the same incident direction as for the laser beam, Ly.

Each of the laser beams (Lm, Lc, Ly, Lk) reaching the polygon mirror (5a, 5b) is deflected by the polygon mirror (5a, 5b) so as to sweep a predetermined sweeping plane. Each of the laser beams (Lm, Lc, Ly, Lk) scans a surface 12 of a corresponding one of four photoconductor drums 11 and forms an image in a respective color. The surface 12 serves as a surface for forming an image in a corresponding color, first and second scanning lenses 6, 7 serve as a second image forming optical system, and first, second and third reflecting mirrors 81, 82, 83, illustrated in FIG. 1, serve in scanning the surface 12. The first scanning lens 6 is an fθ lens, and the second scanning lens 7 is a troidal lens having a long plate-like shape.

Thus, the surfaces 12 of the four photoconductor drums 11 for forming images of magenta, cyan, yellow and black colors are scanned at the same time by the four laser beams (Lm, Lc, Ly, Lk).

In FIG. 1, out of the four photoconductor drums 11, only two of them, the photoconductor drums 11 for magenta and cyan colors, at the right side of the rotating deflector 5, and the first and second scanning lenses 6, 7 and the first, second and third mirrors 81, 82, 83 for the laser beams, Lm and Lc, for scanning the surfaces 12 of the two photoconductor drums 11 in their axial directions, i.e., in the direction perpendicular to the sheet surface, are shown.

In FIG. 2, the reflecting mirrors 81, 82 are not arranged perpendicular to the sheet surface. However, only the parts of the mirrors 81, 82 where laser beams are actually incident on are illustrated in straight lines for the sake of illustration. Further, the third mirrors 83 and the photoconductor drums 11 are not shown. In FIG. 1, illustration has been omitted for the optical path from each laser light source 1 to the polygon mirror (5a, 5b) and for the optical elements on the optical path.

In the optical scanning device illustrated in FIG. 2, the laser beams emitted from the different light sources 1 are incident at the same time on the different deflecting reflective surfaces of the polygon mirrors (5a, 5b) of the rotating deflector 5, so that two laser beams each, the laser beams, Lm and Lc, and the laser beams, Ly and Lk, are deflected by the polygon mirrors (5a, 5b), respectively. Thereby, the construction of the optical scanning device is simplified.

Further, in the optical scanning device, synchronizing mirrors (9m, 9c, 9y, 9k) for the four laser beams (Lm, Lc, Ly, Lk) are provided, as illustrated in FIGS. 1 and 2, on a plane parallel to each sweeping plane of the laser beams (Lm, Lc, Ly, Lk) deflected by the polygon mirrors (5a, 5b) in the vicinity of respective one ends of optical paths of the laser beams scanning the surfaces 12 of the photoconductor drums 11 in the main scanning direction.

The two laser beams, Lc and Lm, deflected by the polygon mirrors (5a, 5b) are caused to be incident on a synchronizing sensor (10a) serving as a common optical detecting device by the synchronizing mirrors, 9c and 9m. Similarly, the two laser beams, Ly and Lk, deflected by the polygon mirrors (5a, 5b) are caused to be incident on a synchronizing sensor (10b) serving as another common optical detecting device by the synchronizing mirrors, 9y and 9k, illustrated in FIG. 2.

The timings of emitting the laser beams, Lc and Lm, and those of emitting the laser beams, Ly and Lk, at the light sources 1 are controlled so that the laser beams, Lc and Lm, and the laser beams, Ly and Lk, will not be incident at the same time on the synchronizing sensor (10a) and the synchronizing sensor (10b), respectively.

Further, in the embodiment, to make each laser beam easily incident on the synchronizing sensor (10a, 10b), a condensing lens (14a) may be provided in front of the synchronizing sensor (10a), and a condensing lens (14b) may be provided in front of the synchronizing sensor (14b).

Furthermore, additional mirrors may be arranged to guide the laser beams (Lm, Lc, Ly, Lk) reflected by the synchronizing mirrors (9m, 9c, 9y, 9k) to the synchronizing sensors (10a, 10b).

In an optical scanning device for scanning a plurality of media with a plurality of laser beams emitted from a plurality of light sources, by arranging synchronizing mirrors at the positions described above, the plurality of laser beams reflected by a single surface of a polygon mirror can be made incident on a single synchronizing sensor. Thereby, the number of synchronizing sensors can be reduced, the construction of the optical scanning device can be simplified, the size of the optical scanning device can be reduced, and the cost of the optical scanning device can be reduced.

In particular, in an optical scanning device scanning a plurality of media, a plurality of laser beams deflected by a rotating deflector so as to sweep different sweeping planes respectively, for example, those laser beams deflected by the polygon mirrors (5a, 5b) arranged in upper and lower steps illustrated in FIG. 1, can be made incident on a common synchronizing sensor by providing synchronizing mirrors on a plane parallel to each of the different sweeping planes of the plurality of laser beams deflected by the rotating deflector in the vicinity of respective optical paths of the deflected laser beams after having been reflected by reflecting mirrors.

Figure 3:
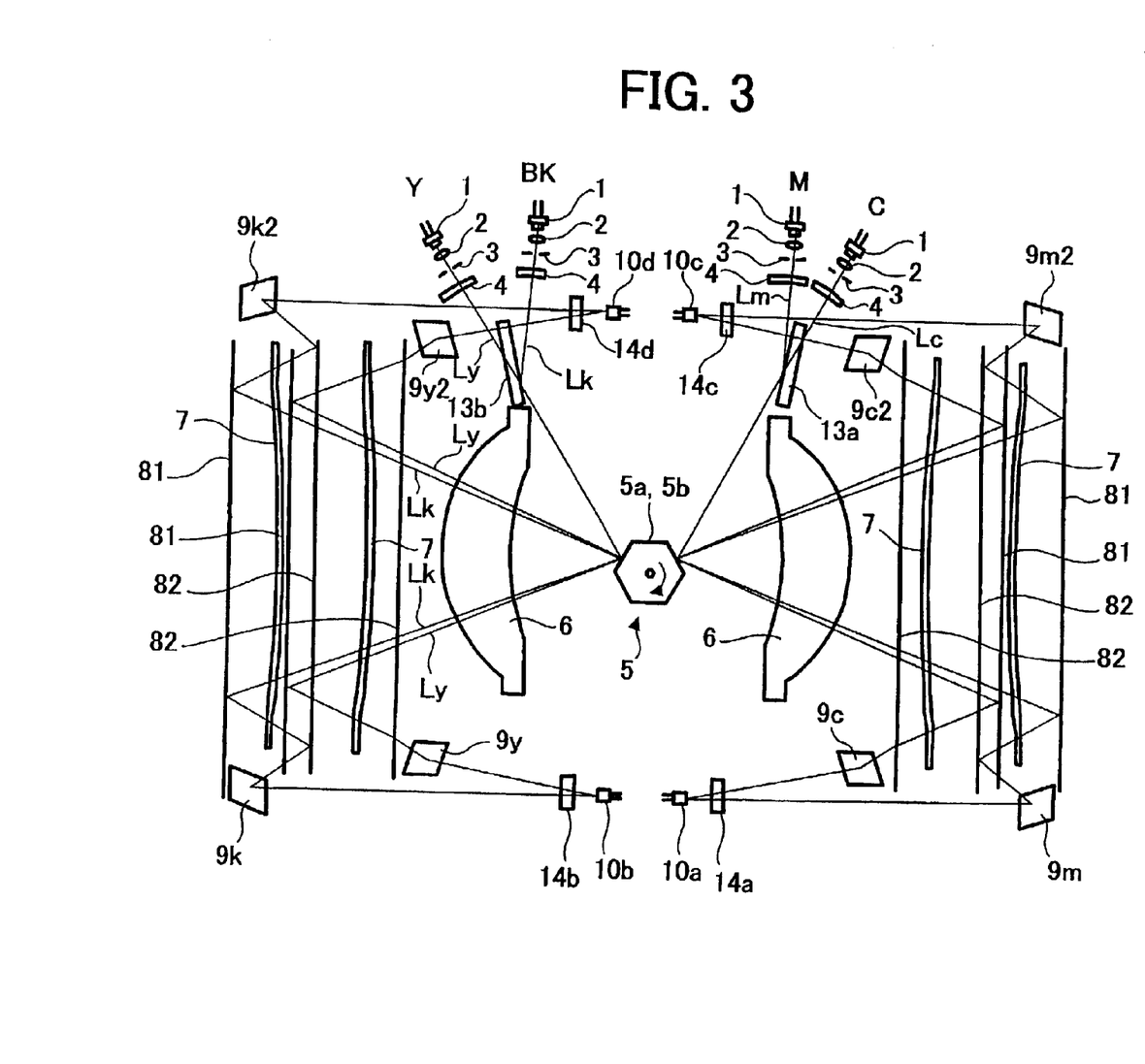
FIG. 3 is a plane view illustrating an optical scanning device according to another embodiment of the present invention.

Now, an optical scanning device according to another embodiment of the present invention is described referring to FIG. 3. FIG. 3 is a drawing similar to FIG. 2, illustrating a construction of the optical scanning device. In FIG. 3, parts identical or corresponding to those in FIG. 2 are denoted by like reference numerals, and the description thereof is omitted.

In this embodiment, as illustrated in FIG. 3, with respect to the laser beams (Lm, Lc, Ly, Lk), second synchronizing mirrors (9m2, 9c2, 9y2, 9k2) are provided as second reflecting devices on a plane parallel to each sweeping plane of the laser beams (Lm, Lc, Ly, Lk) deflected by the polygon mirrors (5a, 5b) in the vicinity of respective ends of optical paths of the laser beams (Lm, Lc, Ly, Lk) scanning the photoconductor drums as media at the side opposite to the side where the synchronizing mirrors (9m, 9c, 9y, 9k) are provided as in the previous embodiment.

Further, in FIG. 3, the laser beams, Lm and Lc, at the right side, reflected by the second synchronizing mirrors (9m2, 9c2) to pass a common condensing lens (14c) are made incident onto a synchronizing sensor (10c) serving as a common optical detecting device separate from the synchronizing sensor (10a).

Furthermore, in FIG. 3, the laser beams, Ly and Lk, at the left side, reflected by the second synchronizing mirrors (9y2, 9k2) to pass a common condensing lens (14d) are made incident onto a synchronizing sensor (10d) serving as a common optical detecting device separate from the synchronizing sensor (10b).

With the configuration as described above, the timings when the four laser beams (Lm, Lc, Ly, Lk) for respective colors pass predetermined positions near both ends of the optical paths of the laser beams (Lm, Lc, Ly, Lk) scanning the surfaces 12 can be detected by the four synchronizing sensors (10a, 10b, 10c, 10d). Thereby, a period of time each laser beam scans a surface in the main scanning direction can be precisely measured.

Furthermore, by adjusting a frequency of a control clock of each laser light source 1 to be lower when the period of time measured as above is longer than a predetermined period of time and higher when the measured period of time is shorter than the predetermined period of time, an error in a length of a scanning area on the surface 12 with each laser beam due to an error in a shape of each optical element or an error in a mounting position of each optical element can be corrected.

In the embodiment described above, the single rotating deflector 5 having the polygon mirrors (5a, 5b) arranged in upper and lower steps is provided as a deflecting device, and four laser beams in total are deflected by the single deflecting device, two laser beams each by different reflecting surfaces of the polygon mirrors (5a, 5b), and the two laser beams are detected by a common synchronizing sensor. However, the above-described advantages of the present invention can be obtained in an optical scanning device having a configuration different from the above-described one. For example, in an optical scanning device for performing optical writing of information using laser beams from a plurality of laser light sources, the above-described advantage can be obtained by providing a synchronizing mirror as a reflecting device, with respect to each of the laser beams from two or more laser light sources, on a plane parallel to sweeping planes of the laser beams deflected by the rotating deflector 5 in the vicinity of respective one ends of optical paths of the laser beams scanning surfaces, and making each of the laser beams incident on a common synchronizing sensor.

Furthermore, the above-described deflecting device is not limited to a polygon mirror of a rotating deflector. Still furthermore, the present invention can be practiced in an optical scanning device having a plurality of rotating deflectors.

Figure 4:
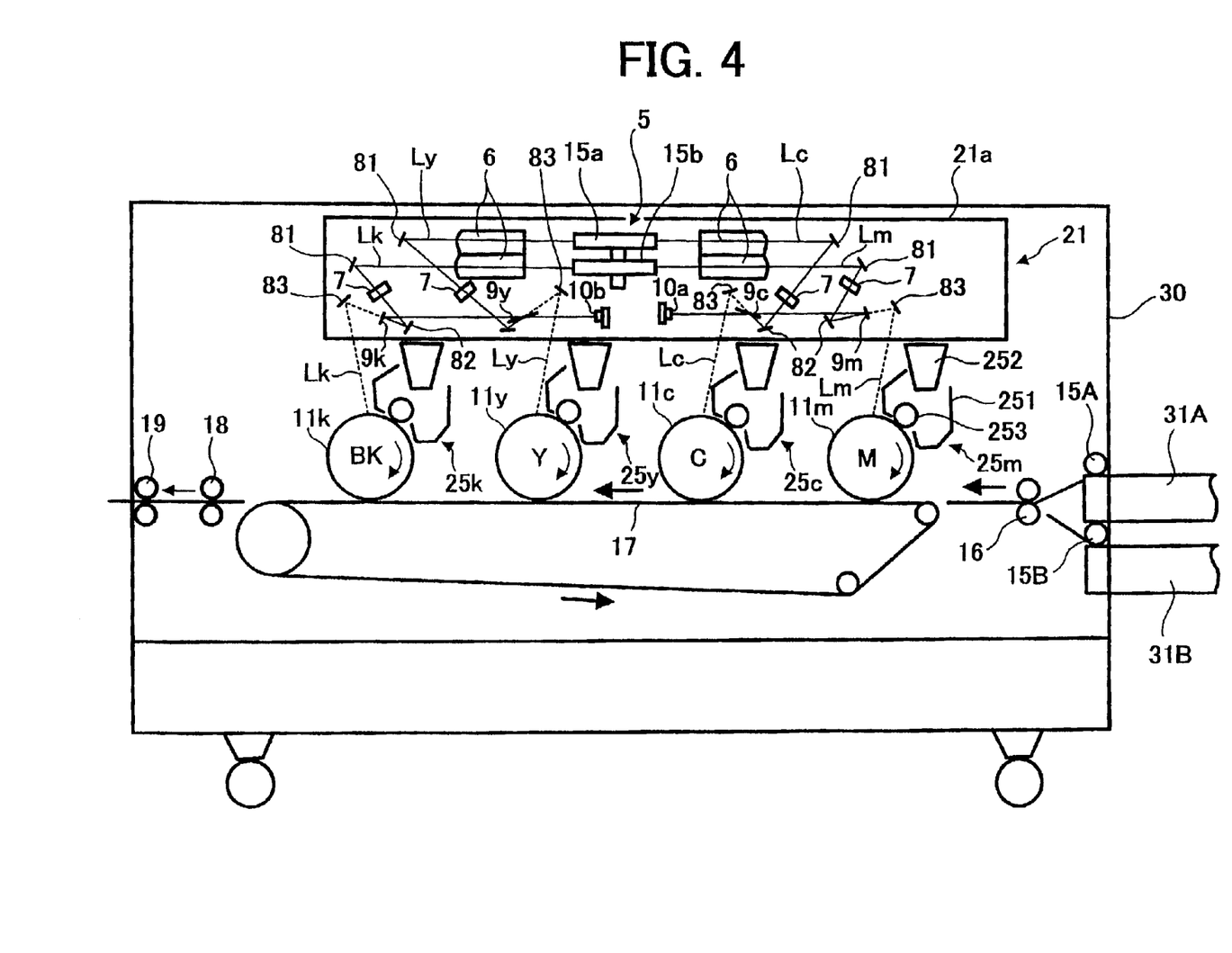
FIG. 4 is a schematic drawing illustrating an image forming apparatus according to an embodiment of the present invention.

Now, an electrphotographic image forming apparatus according to an embodiment of the present invention is described. FIG. 4 illustrates an exemplary construction of the image forming apparatus.

The image forming apparatus is a color laser printer, and includes a housing 30 in which sheet feeding cassettes (31A, 31B) are arranged in two steps. Feeding rollers (15A, 15B) are provided in the housing 30 to feed sheets of different sizes accommodated in the sheet feeding cassettes (31A, 31B) one by one from the uppermost sheets in the sheet feeding cassettes (31A, 31B). Furthermore, a conveying roller 16 to convey each of the sheets, a conveying belt to convey a sheet to a transfer part where a toner image is transferred onto the sheet, a fixing roller 18 to fix the transferred image onto the sheet, and a discharging roller 19 to discharge the sheet are arranged to form a transfer sheet conveying path on a substantially same plane.

Four photoconductor drums (11m, 11c, 11y, 11k) for forming images of magenta (M), cyan (C), yellow (Y), and black (BK) colors, serving as media to be scanned, are arranged along the sheet conveying path. The photoconductor drums (11m, 11c, 11y, 11k) rotate in directions indicated by arrows.

An optical scanning device 21 is arranged above the photoconductor drums (11m, 11c, 11y, 11k). The optical scanning device 21 is the one illustrated in and described with respect to FIGS. 1 and 2. The above-described rotating deflector 5 and optical elements are accommodated in a single case (21a).

Four laser beams (Lm, Lc, Ly, Lk) are emerged through four windows provided at a lower surface of the case (21a) to scan surfaces (surfaces to be scanned) charged by charging devices in the main scanning direction to thereby form electrostatic latent images thereupon.

Developing devices (25m, 25c, 25y, 25k) accommodating magenta, cyan, yellow and black developers, respectively, are provided downstream of scanning positions on the photoconductor drums (11m, 11c, 11y, 11k) scanned by the laser beams (Lm, Lc, Ly, Lk) in the rotating directions of the photoconductor drums (11m, 11c, 11y, 11k). Each of the developing devices (25m, 25c, 25y, 25k) includes a unit case 251, a developer cartridge 252, e.g., a toner cartridge, and a developing roller 253.

Transfer rollers may be arranged at positions opposing the photoconductor drums (11m, 11c, 11y, 11k) sandwiching the transfer belt 17 with the transfer rollers and the photoconductor drums (11m, 11c, 11y, 11k). Cleaning units may be arranged downstream of respective transfer positions of the photoconductor drums (11m, 11c, 11y, 11k).

Latent images formed on the surfaces of the photoconductor drums (11m, 11c, 11y, 11k) scanned by the laser beams (Lm, Lc, Ly, Lk) are developed by the developing devices (25m, 25c, 25y, 25k) to make them visible with magenta, cyan, yellow, and black developers, e.g., toners, respectively.

The toner images in the respective colors formed on the surfaces of the photoconductor drums (11m, 11c, 11y, 11k) are sequentially transferred onto a sheet fed by one of the sheet feeding cassettes (31A, 31B) and conveyed by the conveying belt 17 in a direction indicated by arrow. Thereby, a full color toner image is formed on that sheet. The sheet is then passed through the fixing roller 18, thereby fixing the toner image onto the sheet, and discharged by the discharging roller 19.

The optical scanning device 21 of the embodiment according to the present invention can be made compact and inexpensive as described above. Furthermore, by using the optical scanning device 21 for an image writing device of an image forming apparatus, the image forming apparatus can be made compact and inexpensive.

The present invention can be applied to image forming apparatuses including an optical scanning device using laser beams, other than laser printers, such as copying machines and facsimile apparatuses.

Numerous additional modifications and variations of the present invention are possible in light of the above teachings. It is therefore to be understood that within the scope of the appended claims, the present invention may be practiced otherwise than as specifically described herein.

The present application claims priority and contains subject matter related to Japanese Patent Application No. 2001-024739 filed in the Japanese Patent Office on Jan. 31, 2001, and the entire contents of which are hereby incorporated by reference.

What is claimed as new and is desired to be secured by Letters Patent of the United States is:

1. An optical scanning device for scanning plural photosensitive surfaces, comprising:

a plurality of laser light units each configured to emit a laser beam;

a deflecting device configured to deflect the laser beam emitted from each of the plurality of laser light units to sweep a predetermined plane; and a scanning image forming optical unit configured to project the laser beams deflected by the deflecting device on the plural photosensitive surfaces, respectively, to scan the plural photosensitive surfaces with the laser beams, the scanning image forming optical unit including a plurality of optical detecting devices configured to detect the laser beams and a first plurality of reflecting devices positioned to reflect at least two laser beams of the laser beams toward one of the plurality of optical detecting devices, wherein the first plurality of reflecting devices are each positioned on a plane substantially parallel to a respective one of the predetermined planes in the vicinity of one end of optical scanning of a respective one of the laser beams scanning a respective one of the plural photosensitive surfaces.

2. The optical scanning device according to claim 1, further comprising a second plurality of reflecting devices positioned to reflect the at least two laser beams of the laser beams toward another one of the plurality of optical detecting devices.

3. The optical scanning device according to claim 2, wherein the second plurality of reflecting devices are each positioned on the plane substantially parallel to the respective one of the predetermined planes in the vicinity of another end of the optical path of the respective one of the laser beams scanning the respective one of the plural photosensitive surfaces, the another end of the optical path being opposite to the end of the optical path where the first plurality of reflecting devices are positioned.

4. An image forming apparatus, comprising:

a plurality of photoconductors; and an optical scanning device configured to scan the plurality of photoconductors to form a latent image in a color thereupon, the optical scanning device including a plurality of laser light units each configured to emit a laser beam, a deflecting device configured to deflect the laser beam from each of the plurality of laser light units to sweep a predetermined plane, and a scanning image forming optical unit configured to project the laser beams deflected by the deflecting device on the plurality of photoconductors, respectively, to scan the plurality of photoconductors with the laser beams, the scanning image forming optical unit including a plurality of optical detecting devices configured to detect the laser beams and a first plurality of reflecting devices positioned to reflect at least two laser beams of the laser beams toward one of the plurality of optical detecting devices, wherein the first plurality of reflecting devices are each positioned on a plane substantially parallel to a respective one of the predetermined planes in the vicinity of one end of optical scanning of a respective one of the laser beams scanning a respective one of the plurality of photoconductors.

5. The image forming apparatus according to claim 4, wherein the optical scanning device further includes a second plurality reflecting devices positioned to reflect the at least two laser beams of the laser beams toward another one of the plurality of optical detecting devices.

6. The image forming apparatus according to claim 5, wherein the second plurality of reflecting devices are each positioned on the plane substantially parallel to the respective one of the predetermined planes in the vicinity of another end of the optical path of the respective one of the laser beams scanning the respective one of the plural surfaces, the another end of the optical path being opposite to the end of the optical path where the first plurality of reflecting devices are positioned.

7. The image forming apparatus according to claim 4, further comprising:

a plurality of developing devices provided respective of the plurality of photoconductors and each configured to develop the latent image with a toner of a corresponding color into a toner image in the corresponding color; and a transfer device configured to transfer the toner images on the plurality of photoconductors onto a sheet by sequentially superimposing one upon another to form a full color image on the sheet.

8. An optical scanning device for scanning plural photosensitive surfaces, comprising:

laser beam emitting means for emitting a plurality of laser beams;

deflecting means for deflecting the plurality of laser beams from the laser beam emitting means such that each of the plurality of laser beams sweeps a predetermined plane; and projecting means for projecting the laser beams deflected by the deflecting means on the plural photosensitive surfaces, respectively, to scan the plural photosensitive surfaces with the laser beams, the projecting means including a plurality of optical detecting devices configured to detect the laser beams and reflecting means for reflecting at least two laser beams of the laser beams toward one of the plurality of optical detecting devices, wherein the reflecting means are positioned on a plane substantially parallel to a respective one of the predetermined planes in the vicinity of one end of optical scanning of a respective one of the laser beams scanning a respective one of the plural photosensitive surfaces.

9. An image forming apparatus, comprising:

image bearing means for bearing a plurality of images; and optical scanning means for scanning the image bearing means to form a latent image in a color thereupon, the optical scanning means including laser beam emitting means for emitting a plurality of laser beams, deflecting means for deflecting the laser beams from the laser beam emitting means such that each of the plurality of laser beams sweeps a predetermined plane, projecting means for projecting the laser beams deflected by the deflecting means on the image bearing means to scan the image bearing means with the laser beams, the projecting means including a plurality of optical detecting devices configured to detect the laser beams and reflecting means for reflecting at least two laser beams of the plurality of laser beams toward one of the plurality of optical detecting devices, wherein the reflecting means are positioned on a plane substantially parallel to a respective one of the predetermined planes in the vicinity of one end of optical scanning of a respective one of the laser beams scanning a respective one of the image bearing means.

* * * * *